(12) United States Patent
Houck et al.

(10) Patent No.: US 9,475,109 B2
(45) Date of Patent: Oct. 25, 2016

(54) METHOD OF MANUFACTURING A HOLLOW EXTERNALLY THREADED FASTENER

(71) Applicants: Joel M. Houck, Cedar Lake, IL (US); Gerald W. Hagel, Lombard, IL (US); Burak Gursel, Pleasanton, CA (US)

(72) Inventors: Joel M. Houck, Cedar Lake, IL (US); Gerald W. Hagel, Lombard, IL (US); Burak Gursel, Pleasanton, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 102 days.

(21) Appl. No.: 14/145,868

(22) Filed: Dec. 31, 2013

(65) Prior Publication Data

US 2015/0183014 A1 Jul. 2, 2015

(51) Int. Cl.
| | |
|---|---|
| *B21D 37/06* | (2006.01) |
| *B21C 37/20* | (2006.01) |
| *B21K 1/56* | (2006.01) |
| *B21C 37/06* | (2006.01) |
| *B21C 25/02* | (2006.01) |
| *B21C 25/04* | (2006.01) |
| *B21K 21/08* | (2006.01) |
| *B21J 9/06* | (2006.01) |
| *B21K 5/12* | (2006.01) |
| *F16B 25/00* | (2006.01) |

(52) U.S. Cl.
CPC ............ *B21C 37/065* (2013.01); *B21C 25/02* (2013.01); *B21C 25/04* (2013.01); *B21C 37/207* (2013.01); *B21J 9/06* (2013.01); *B21K 1/56* (2013.01); *B21K 5/12* (2013.01); *B21K 21/08* (2013.01); *F16B 25/0026* (2013.01); *F16B 25/0052* (2013.01)

(58) Field of Classification Search
CPC ..... B21C 37/065; B21C 37/06; B21C 37/20; B21C 37/207; B21C 37/205; B21C 37/202; B21J 9/06; B21D 15/02; B21D 15/04; B21D 17/02; B21D 17/025; B21K 1/56; B21K 21/08
See application file for complete search history.

(56) References Cited

U.S. PATENT DOCUMENTS

| | | |
|---|---|---|
| 353,929 A | 12/1886 | Fitzgerald |
| 1,490,069 A | 5/1921 | Gammons |
| 1,802,560 A | 4/1923 | Kerwin |

(Continued)

FOREIGN PATENT DOCUMENTS

| | | |
|---|---|---|
| DE | 29502052.0 | 5/1995 |
| DE | 298 12947 U1 | 1/2000 |

(Continued)

OTHER PUBLICATIONS

"Anchoring and Fastening Systems for Concrete and Masonry", Simpson Strong-Tie Catalog, C-SAS-2012, Jan. 1, 2012, cover and back page, p. 110,111,123,127,150,151 and back cover, Simpson Strong-Tie Company, Inc., USA.

*Primary Examiner* — Debra Sullivan
(74) *Attorney, Agent, or Firm* — Charles R. Cypher; James R. Cypher (57) ABSTRACT

A method of and device for manufacturing a hollow anchor with a radial, helical contour on its outer surface is provided. The contour is preferably a raised external contour or helix that is formed on the outer wall of the anchor and is suitable for tapping a thread in masonry. The hollow anchor formed by the method has an internal cavity that can receive another member and an outer surface with a raised external contour that is suitable for tapping a thread in a blind bore in a masonry member.

6 Claims, 14 Drawing Sheets

(56) References Cited

U.S. PATENT DOCUMENTS

| | | | |
|---|---|---|---|
| 2,380,724 A | 1/1944 | Crooks |
| 3,739,682 A | 6/1973 | Siebol et al. |
| 3,792,603 A | 2/1974 | Orain |
| 3,911,781 A | 10/1975 | Bappert |
| 3,937,119 A | 2/1976 | Ernst |
| 4,034,641 A | 7/1977 | Williams, Jr. et al. |
| 4,350,464 A | 9/1982 | Brothers |
| 4,439,077 A | 3/1984 | Godsted |
| 4,544,313 A | 10/1985 | Grossberndt |
| 4,652,194 A | 3/1987 | Tajima et al. |
| 4,842,467 A | 6/1989 | Armstrong |
| 4,892,429 A | 1/1990 | Giannuzzi |
| 4,973,210 A | 11/1990 | Osborne et al. |
| 5,054,982 A | 10/1991 | Freeman |
| 5,061,136 A | 10/1991 | Dixon et al. |
| 5,116,337 A | 5/1992 | Johnson |
| 5,188,496 A | 2/1993 | Giannuzzi |
| 5,190,426 A | 3/1993 | Wieder et al. |
| 5,282,708 A | 2/1994 | Giannuzzi |
| 5,294,227 A | 3/1994 | Forster et al. |
| 5,294,337 A | 3/1994 | Johnson |
| RE34,969 E | 6/1995 | Dixon et al. |
| 5,518,351 A | 5/1996 | Peil |
| 5,531,553 A | 7/1996 | Bickford |
| 5,605,423 A | 2/1997 | Janusz |
| 5,606,887 A * | 3/1997 | Spiegelberg ........... B21D 28/28 72/354.6 |
| 5,634,367 A | 6/1997 | Yamada et al. |
| 5,674,035 A | 10/1997 | Hettich et al. |
| 5,697,746 A | 12/1997 | Brown et al. |
| 5,755,542 A | 5/1998 | Janusz et al. |
| 5,885,041 A | 3/1999 | Giannuzzi et al. |
| 5,913,792 A | 6/1999 | Fischer |
| 5,957,646 A | 9/1999 | Giannuzzi et al. |
| 5,995,041 A | 11/1999 | Bradley et al. |
| 6,000,892 A | 12/1999 | Takasaki |
| 6,142,719 A | 11/2000 | Daubinger et al. |
| 6,296,433 B1 | 10/2001 | Forsell et al. |
| 6,317,979 B1 | 11/2001 | Yamawaki |
| 6,322,307 B1 | 11/2001 | Glover |
| 6,367,205 B2 | 4/2002 | Cornett, Sr. |
| 6,371,709 B1 | 4/2002 | Papafotiou et al. |
| 6,406,376 B1 | 6/2002 | Lin |
| 6,443,680 B1 | 9/2002 | Bodin |
| 6,481,260 B2 | 11/2002 | Jung |
| 6,571,890 B2 | 6/2003 | Obermeier |
| 6,619,899 B1 | 9/2003 | Gaudron |
| 6,623,228 B1 | 9/2003 | Hettich et al. |
| 6,666,638 B2 | 12/2003 | Craven |
| 6,688,071 B1 | 2/2004 | Evers et al. |
| 6,941,635 B2 | 9/2005 | Craven |
| 7,056,075 B2 | 6/2006 | Powers et al. |
| 7,070,376 B1 | 7/2006 | Toback |
| 7,082,664 B2 | 8/2006 | Powers |
| 7,114,902 B2 | 10/2006 | Reiter |
| 7,189,045 B2 | 3/2007 | McGovern |
| 7,237,424 B2 | 7/2007 | Crutchley |
| 7,287,406 B2 | 10/2007 | Hwang |
| 7,441,998 B2 | 10/2008 | Gahler et al. |
| 7,607,333 B2 | 10/2009 | Sivley et al. |
| 8,359,725 B1 | 1/2013 | Tauzer |
| 8,382,601 B2 | 2/2013 | Gensert |
| 2004/0096291 A1 | 5/2004 | Reiter |
| 2014/0325815 A1 * | 11/2014 | Dahl ..................... B21K 1/56 29/428 |

FOREIGN PATENT DOCUMENTS

| | | |
|---|---|---|
| EP | 0232030 B1 | 1/1987 |
| EP | 0560789 B1 | 9/1991 |
| EP | 0502746 A1 | 3/1992 |
| EP | 623759 A1 | 11/1994 |
| EP | 625400 A1 | 11/1994 |
| EP | 0623759 B1 | 3/1995 |
| EP | 1536149 A2 | 11/2004 |
| FR | 2642801 | 8/1990 |
| WO | WO 92/10688 | 6/1992 |

* cited by examiner

METHOD OF MANUFACTURING A HOLLOW EXTERNALLY THREADED FASTENER

BACKGROUND OF THE INVENTION

The present invention provides: a method of manufacturing a hollow anchor with a threaded outer surface, the device for carrying out the method and the anchor made thereby.

The anchor of the present invention has many uses, but it is designed specifically to be used as a masonry anchor in construction environment where a designer would like a threaded female coupling embedded in a cementitious or other masonry member.

There are many internally threaded, female coupling anchors for cementitious members. The anchor of the present invention installs easily because it is formed with an outer thread or helical contour that allows the anchor to be driven into an unthreaded, cylindrical masonry bore. The outer, radial thread formed on the anchor taps its own thread groove in the wall of the bore, making a strong and positive attachment with the concrete member.

The anchor is particularly useful for being installed in overhead ceilings where it is difficult for workman to operate. The anchor is installed in the concrete after the concrete has set which allows for the anchor to be place exactly where it is needed, and on an as-needed basis. In overhead applications, the goal is to require as few placement steps as is necessary as working overhead can be very tiring. With the present anchor, there are only two major steps. A blind hole is drilled in the concrete with a powered driver. Preferably, the driver can be used both to drill the bore, and then the drill attachment can be removed and a driver, such as a hex head driver can be fitted. There are also drivers that can fit over drill bits on powered drivers which can be used. The hole is cleaned and then using the driver with an attachment that couples with a mating surface of the anchor, the anchor is rotatably driven into the hole. The anchor cuts its own threads in the wall of the hole or bore and is thus called a self-tapping masonry anchor.

Anchors having an internally threaded bore and a self-tapping, outer thread for use in masonry are not new in the art. U.S. Pat. No. 7,056,075, granted to Powers, teaches such an anchor. The self-tapping outer thread of U.S. Pat. No. 7,056,075 differs from the present invention in many respects, but perhaps most importantly, in U.S. Pat. No. 7,056,075, the outer thread and the inner driving portion are formed in two separate operations. A cold forming draw process is used to form the internal driving area, while in a separate step, a rolling pin is used to create the thread on the outer surface. With any self-tapping, threaded masonry anchor the proper formation of the self-tapping outer thread is critical. The ability of the anchor to make a strong connection with the masonry substrate depends soley on the way the thread or threads of the anchor interact with the masonry. Thus it is important that thread can be made accurately and that the dimensions and tolerances for the outer thread remain uniform over production runs. It is believed that particular features of the present anchor are unique and the method of manufacture provided herein allows for high quality anchors to be produced economically.

According to the method of the present invention, the outer thread is formed on a hollow blank in a non-cutting operation with the outer surface of the blank being plastically deformed by the action of radial forces generated by a mandrel inserted through the hollow blank. Not only does this method of formation allow for an anchor to be formed with a self-cutting thread that will create a strong connection with the masonry substrate, it allows the anchor to be made with unique features that further add to the quality of the connection made with the anchor.

SUMMARY OF THE INVENTION

It is an object of the present invention it to provide a method of manufacturing a hollow anchor with a radial contour on its outer surface, where the contour is formed precisely and efficiently. The contour is preferably a raised external helix that is formed on the outer wall of the anchor and is suitable for tapping a threaded groove in masonry.

It is a further object of the present invention to provide a device for carrying out the method of forming the hollow anchor with an external thread.

It is a further object of the present invention to provide a hollow anchor having an internal cavity that can receive another member and an outer surface with a raised external contour that is suitable for tapping a thread in a blind bore in a masonry member. Preferably, the hollow anchor has an internal bore that passes all the way through the anchor along a longitudinal axis of the anchor from the rear end to the front end.

These objects of the present invention are provided in part by using a multi-part split die for forming the anchor, where the die inserts having inner surface profiling that forms the intended radial outer contour on a hollow blank when a mandrel is inserted through the hollow blank and causes plastic deformation of the material of the blank.

These objects of the present invention are provided in part by using a mandrel to create the outward radial forces to cause material flow into the radial contour-forming die segments. By using a mandrel to create the outward radial forces to cause material flow into the radial contour-forming die segments, the die segments merely need to be held in place at the correct locations, when the die is in the closed position and the mandrel is acting on the hollow blank. This method of operating the die and mandrel achieves, in part, the object of forming the anchors with an outer thread contour in a reliable and economically efficient manner.

These objects of the present invention are also provided in part by using a mandrel having a stepped diameter where it interacts with the hollow blank.

It is also an object of the present invention to provide the mandrel with a forming portion that creates the driving tool fitting portion of the internal bore in the anchor. The driving tool fitting portion can releasably engage an anchor inserting and driving tool such as a powered driver fitted with a hexagonal driving head. Preferably, the driving tool fitting portion is formed in the upper portion of the axial internal bore of the blank.

The object of efficiently and reliably producing female anchors with threaded outer surface is also achieved in part by forming the insert segments of the die so they easily move between their open and their closed positions. This is accomplished by forming the die inserts with keyed, tapering outer surfaces and, by operation of the die, forcing them downward in keyed and tapering raceways in the insert segment holder such that they are brought closer together and into closed position from the open position.

DETAILED DESCRIPTION

In the simplest form of the method of the invention, a hollow, generally cylindrical blank 1, preferably formed of steel, is placed in a cavity 2 in a contour-forming die 3, and a mandrel 4, both the mandrel 4 and die 3 being preferably formed of steel, having extruding portions 28 is inserted through the hollow blank so as to force the material of the blank 1 to flow and shift radially outwardly into the contour forming portions 5 of the die inserts 6 of the multi-part, split die 3 and also to shift and form around the outer surface 7 of the mandrel 4. The die inserts or insert segments 6 are also sometimes called negative dies in the art. Operation of the die 3 creates an external contour 8 on the outer surface 9 of the hollow anchor 10 which as shown is a helical thread suitable for tapping a masonry bore.

The insert segments 6 are mounted on the holder 11 so as to be radially movable. The outer surfaces 12 of the die inserts 6 and the inner surfaces 13 of the holder 11 on which they ride are tapered such that the die inserts 6 are movable into the closed position 14 and the opened position 15 by the axial movement of the die inserts 6 in relation to the insert segment holder 11. Upward movement of the die inserts 6 allows them to open and increase the size of the cavity 2, while downward movement brings the die inserts 6 together and makes the cavity 2 smaller.

The term external contour 8 covers projections, projecting threads, individual grooves or undercuts. The external contour 8 is generally a radial helix, such as a thread, but it can take other forms. The radial outer contour or contours 8 can be arranged over the entire area of the blank 1 or only at specific points.

The hollow blank 1 can be cylindrical or cone shaped.

The insert segments 6 of the die 3 in combination with the mandrel 4 also form the flared upper outer portion 16 of the anchor 10 and the tapering bottom entry portion 17 of the anchor 10. The hollow blank 1 has a forward end 18 and a trailing end 19. In the preferred embodiment, the outer surface 9 of the forward end 18 is preferably formed with a camfer or angled face 20 to assist with aligning the anchor 10 in a masonry hole 21. In the preferred embodiment, a camfer or angled face 22 is also formed between the threaded portion 23 of the anchor 10 and the trailing end or crown 19 of the anchor 10. The camfers 20 and 22 are formed as the outer surfaces of truncated cones. Preferably, the outer diameter of the external contour 8 is larger than the diameter of the trialing end 19 of the anchor 10. Preferably, when the anchor 10 is approximately 1.625 inches long the portion of the outer surface 9 formed with an external contour 8 extends over more than half the length of the anchor 10 and preferably extends approximately 1.175 inches. Preferably, the external contour 8 is a helical thread with a thread profile of 50 degrees, and a thread spacing of approximately 0.35 inches, an outer thread diameter of approximately 0.632 inches, and with a thread that runs out smoothly at both trailing end 19 and the forward end 18 with the run out at the forward end 18 not exceeding an angle of 60 degrees around the anchor 10 and the run out at the trailing end 19 not exceeding 135 degrees. The steel of the anchor 10 is preferably SAE J403 Grade 10B21.

The hollow anchor blank 1 is formed by known methods with a bore 38 that extends through the blank 1 along the longitudinal axis 39 of the blank.

The blank 1 is held within the cavity 2 created by a plurality of inserts 6, preferably three. The die inserts 6 are preferably "open" in a starting or opened position 15 for receiving the blank 1. Even when the die inserts 6 are fully closed the cavity 2 still exists between them where the blank 1 is held.

The die inserts 6 are keyed on their outer surfaces 12 to attach to the insert segment holder 11. The outer surfaces 12 of the die inserts 6 are tapered and travel in tapered race ways 24 in the insert segment holder 11. The insert holder 11 can be contained within an outer casing that is not shown.

As the blank 1 is set into position within the segments/inserts 6, a punch or mandrel 4 with an outer diameter that widens from the bottom portion 44 of the mandrel 4 to the top portion 45 of the mandrel 4, preferably in a stepped fashion, and in the preferred embodiment also has a specially shaped top portion 25, is inserted through a top guide (not shown) on top of the die 3 which aligns the mandrel 4 with the cavity 2 formed by the die inserts 6. A first smooth section 26 of the punch/mandrel shaft passes through the inner hollow 38 of the blank 1 and engages with a lower punch guide 27.

As the punch or mandrel 4 travels further through the blank 1, the steps or shoulders 28 on the punch 4 start to engage with the inner surface or wall 29 of the blank 1 and begin to exert outward or lateral pressure on the inner wall 29 of the blank 1. The steps 28 are formed such that the diameter of the mandrel increases in size after each step 28 as the steps travel up the mandrel 4. This upsets the material around the outer perimeter of the blank 1 and thus this material extrudes outwardly and fills the contour profiles 5 cut into the die insert segments 6. The contour profile 5 is preferably a radial helix consisting of aligned thread cavities 5 in each inner surface 30 of each die segment 6.

As the mandrel or punch 4 continues to travel through the blank 1, the upper section of the mandrel 25 with the specially shaped top engages the crown 19 of the blank 1 and further forces material down and into the upper thread cavities 5 in the segments or die inserts 6. In the preferred embodiment, the specially shaped top 25 also generates the hexagonal socket 31 in the crown 19 of the blank 1.

In the preferred embodiment when the hexagonal formation 31 has been made sufficiently deep, the punch 4 reverses direction and the mandrel 4 is extracted from the trailing end of the anchor or blank 1. When the punch 4 reverses direction, the keyed and tapered die segments 6 also move upwardly in the segment holder 11 by operation of a lifter 32 until the inset segments 6 open wide enough to release the anchor 10.

An additional step creates an internal thread 33 on the inner surface of the anchor 10. In the preferred embodiment, the thread 33 is formed below the internal hexagonal driver receiving portion 31 in the crown 19 of the anchor 10.

The anchor 10 can be heat treated and plated following the formation of the internal thread. The formation of the anchor 10 can be carried out on a multi-stage press known in the art.

Figure 1:
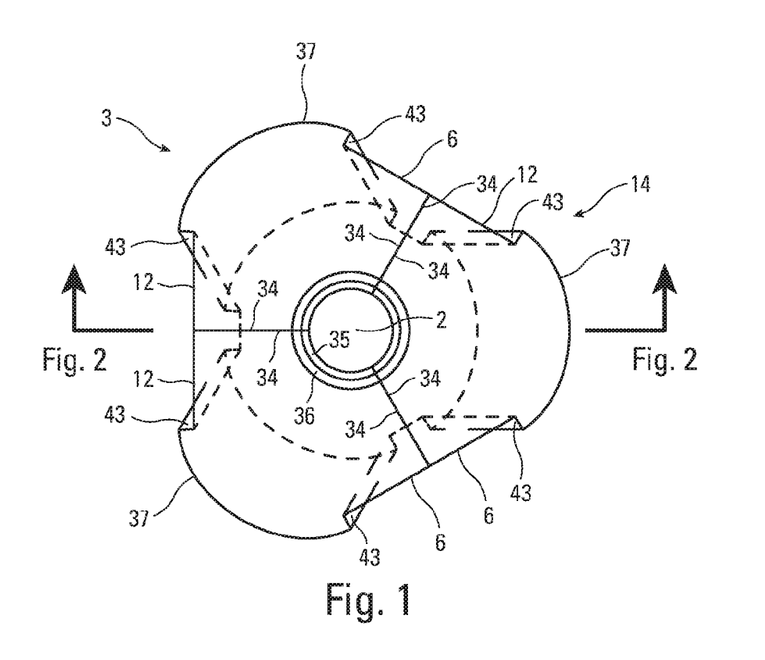
FIG. 1 is a top view of the die inserts of the present invention shown in contact as they would be in the closed position of the die.
Figure 2:
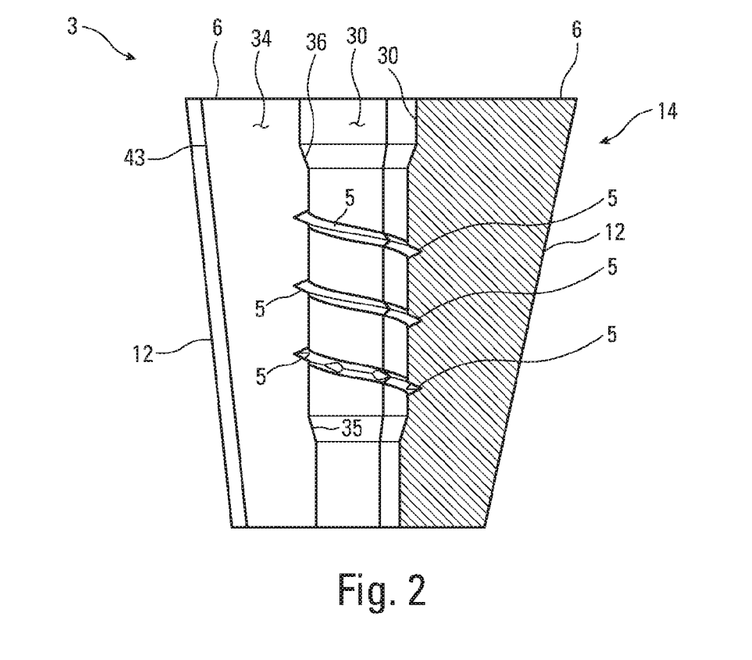
FIG. 2 is cross-sectional side view of the die inserts of FIG. 1, taken along the view line shown in FIG. 1.
Figure 3:
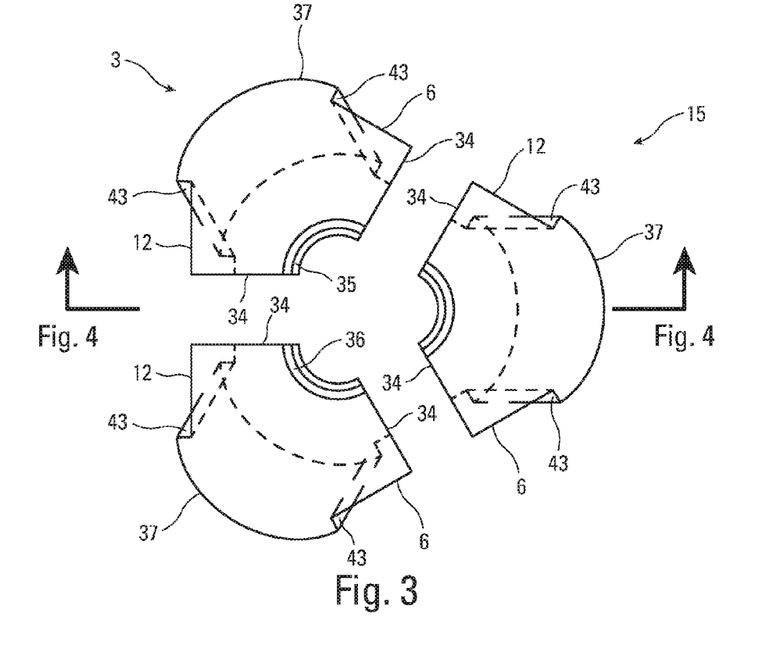
FIG. 3 is a top view of the die inserts of FIG. 1 shown separated from each other as they would be in the opened position of the die.
Figure 4:
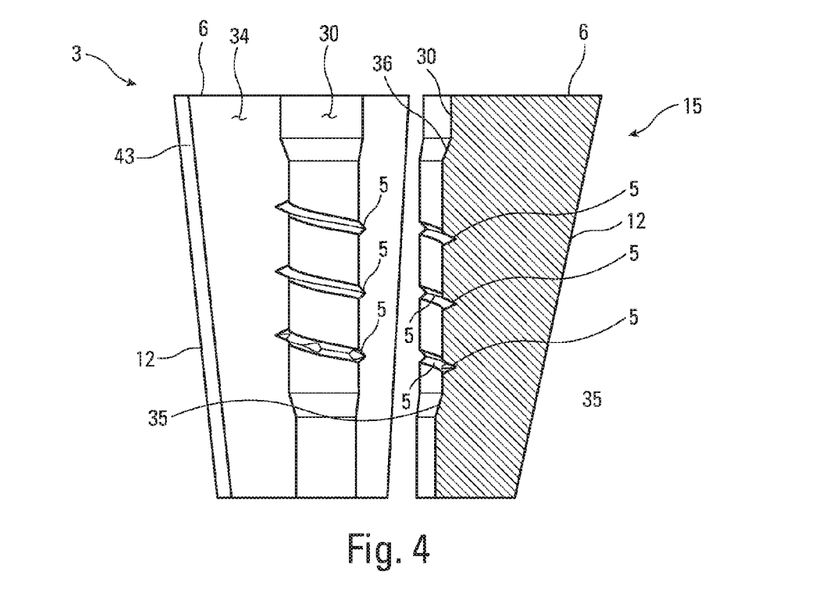
FIG. 4 is a cross sectional side view of the die inserts of FIG. 3, taken along the view line shown in FIG. 2.
Figure 5:
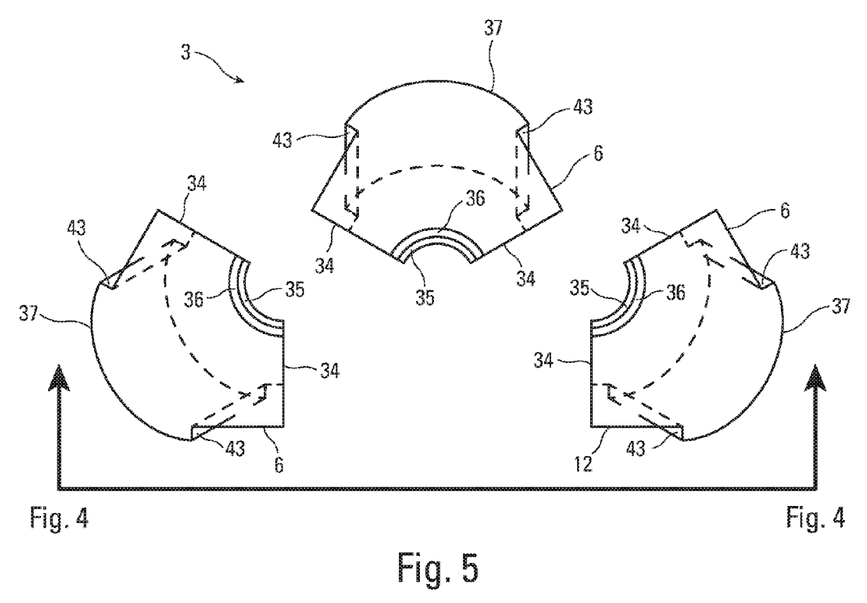
FIG. 5 is an exploded top view of the die inserts of FIG. 1.
Figure 6:
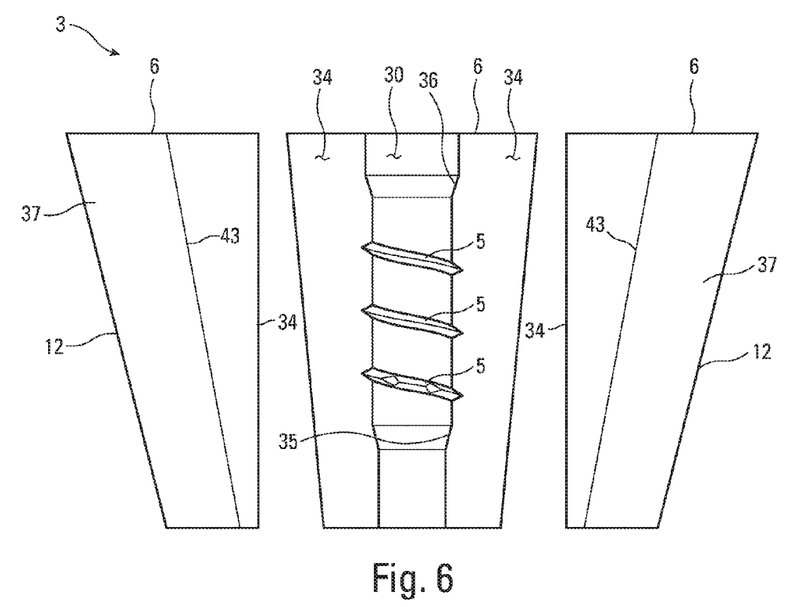
FIG. 6 is a side view of the die inserts of FIG. 5 taken along the view line shown in FIG. 6.
Figure 7:
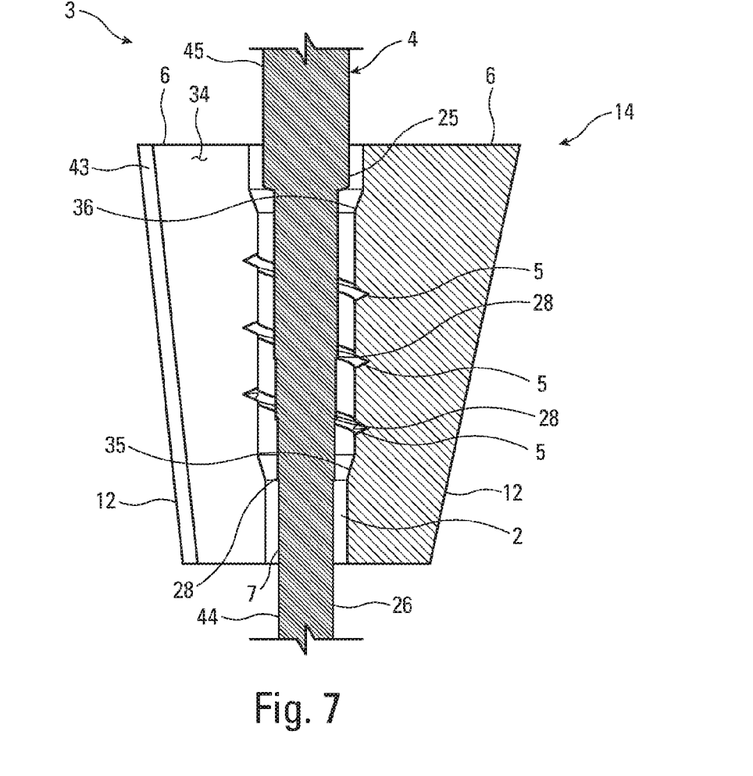
FIG. 7 is a cross-sectional side view of the die inserts and mandrel, with the die inserts shown in the closed position and the mandrel shown fully inserted into the die inserts.
Figure 8:
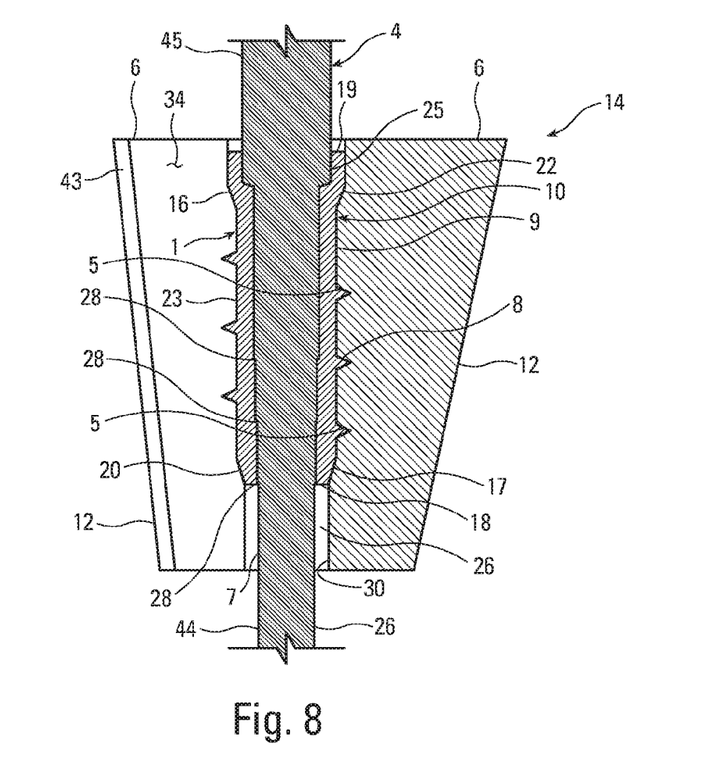
FIG. 8 is a cross-sectional side view of the dies inserts and mandrel similar to FIG. 7 with a formed anchor shown in cross-section.
Figure 9:
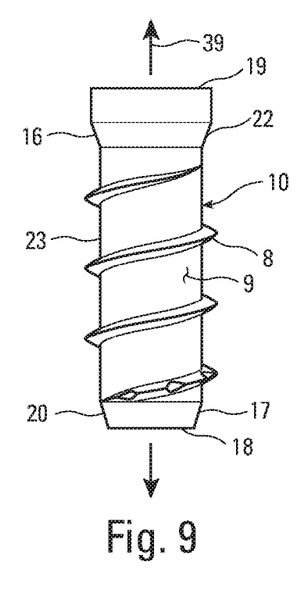
FIG. 9 is side view of the anchor of the present invention.
Figure 10:
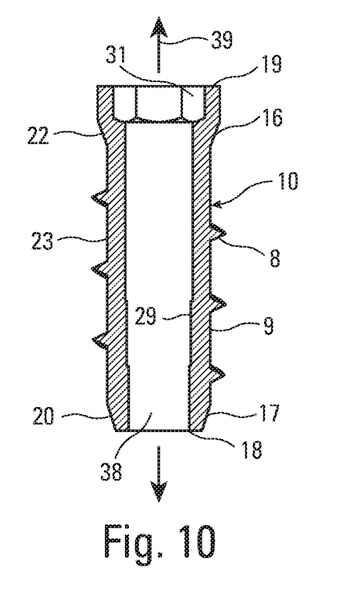
FIG. 10 is a cross-sectional side view of the anchor of the present invention.
Figure 11:
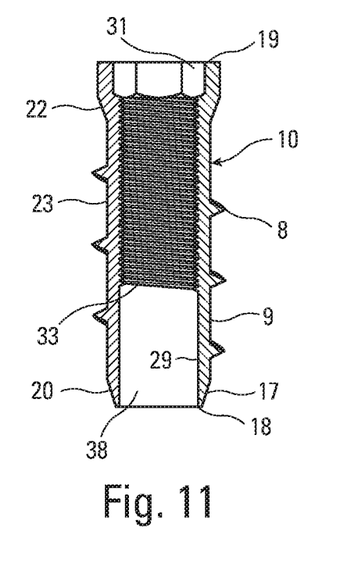
FIG. 11 is a cross-sectional side view of the anchor of the present invention with internal threads formed on the inner surface of the anchor.
Figure 12:
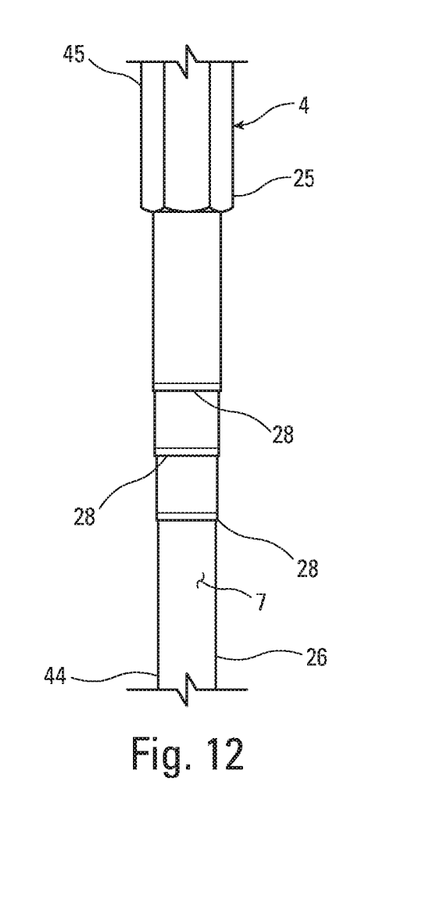
FIG. 12 is side view of the mandrel of the present invention.
Figure 13:
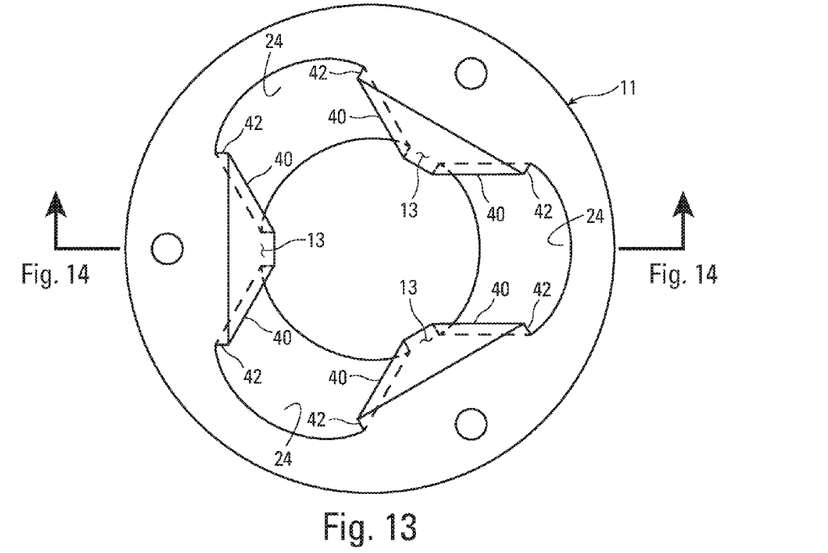
FIG. 13 is a top view of the die insert holder of the present invention.
Figure 14:
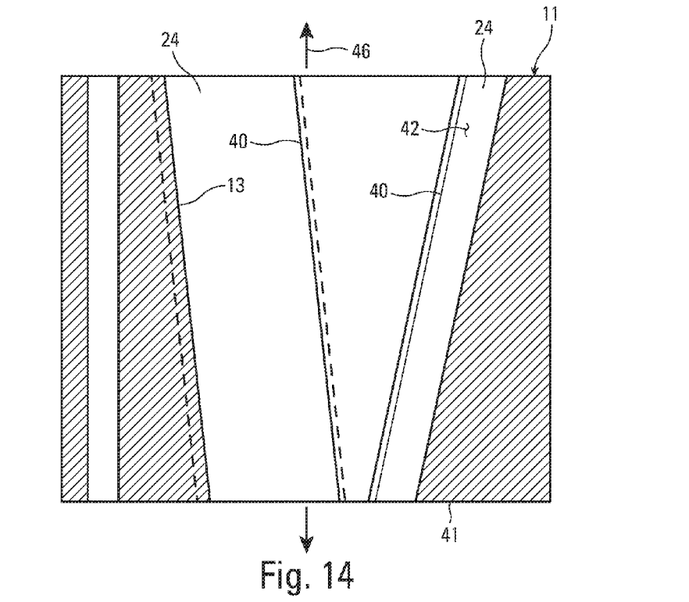
FIG. 14 is a cross-sectional side view of the die insert holder of the present invention taken along the view line in FIG. 14.
Figure 15:
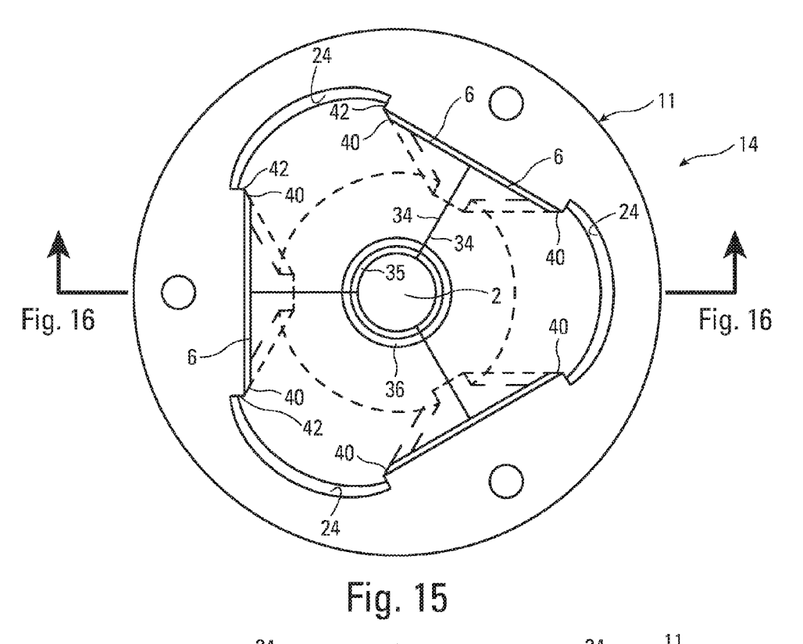
FIG. 15 is top view of the die inserts received in the holder of the present invention with the die inserts in the closed position.
Figure 16:
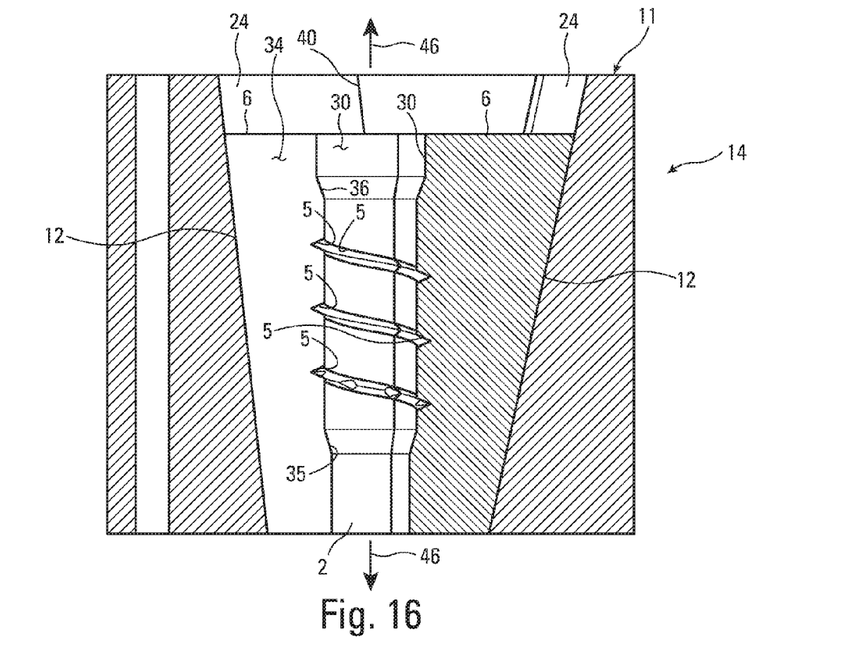
FIG. 16 is a side view of the die inserts and holder shown in FIG. 15 taken along the view line in FIG. 16.
Figure 17:
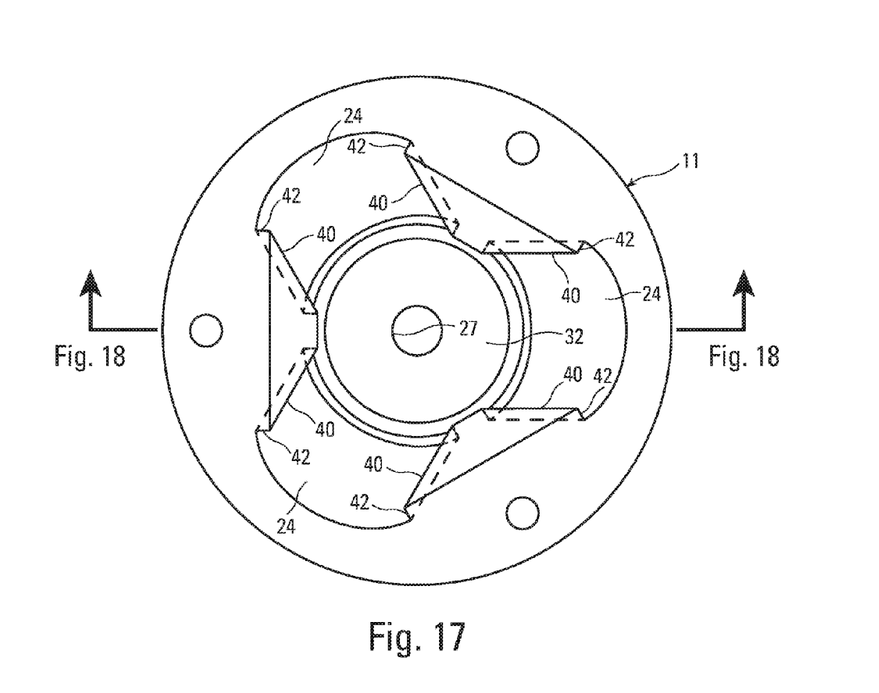
FIG. 17 is a top view of the holder, lifter and lower mandrel guide of the present invention.
Figure 18:
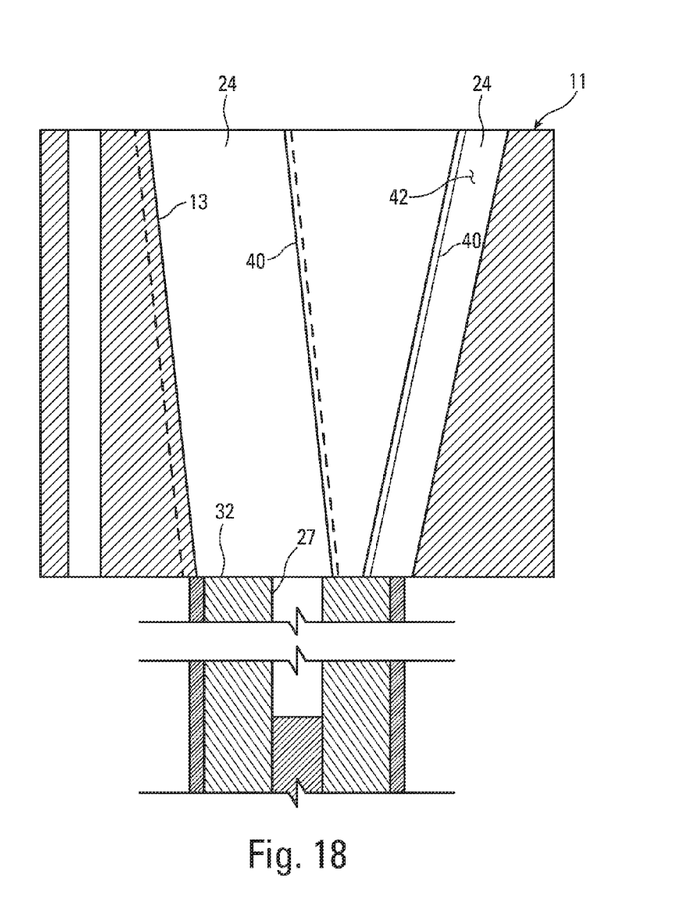
FIG. 18 is a cross-sectional side view of the holder, lifter and lower mandrel shown in FIG. 17 taken along the view line shown in FIG. 17.
Figure 19:
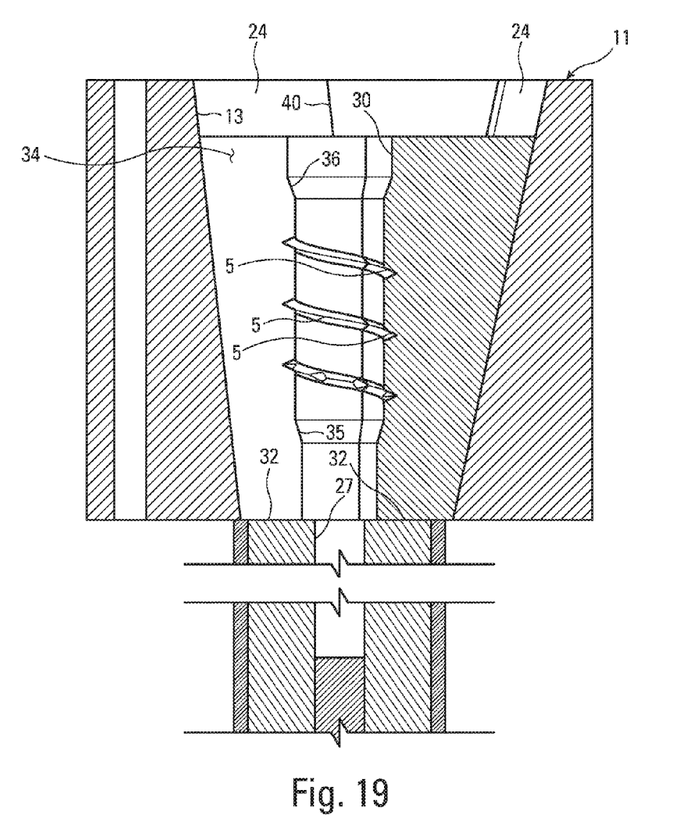
FIG. 19 is a cross-sectional side view of the present invention similar to FIG. 18 with the die inserts shown received in the holder in the closed position.
Figure 20:
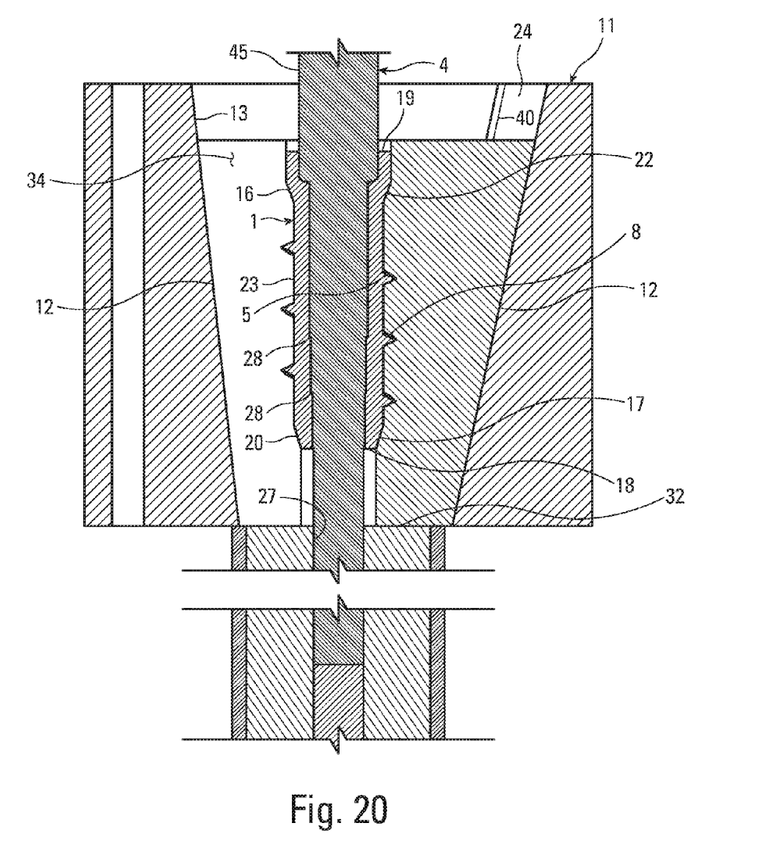
FIG. 20 is a cross-sectional side view of the present invention similar to FIG. 19 with the mandrel and a anchor shown received in the holder.

As shown in FIG. 1, the die inserts 6 have planar side faces 34 that interface with each other when the die inserts 6 are in the closed position 14. As shown in FIG. 2, the inner surfaces 30 of the die inserts 6 are preferably formed with a lower inwardly tapering portion 35 and an upper inwardly tapering portion 36 that bracket the portion of the inner surface 30 of the die segments 6 where the contour forming portions 5 of the die 3 are provided. Above the upper inwardly tapering portion 36 the inner surface is preferably cylindrical. The keyed portions 37 of the outer surfaces 12 of the die inserts 6 fit within the cavities or race ways 24 provided in the holder 11.

As shown in FIG. 1, each race way 24 has a pair of side walls 40 that extend along the tapering inner surface 13 towards the bottom 41 of the holder 11 along and at an angle to the longitudinal axis 46 of the holder 11. The surfaces 42 of the pair of side walls 40 are set at an angle to each other such that they hold the keyed portions 37 of the die insets 6. Matching walls 43 in the keyed portions of the insert segments 6 align with and slide along the side walls 40. These walls 40 and 43 travel along the die inserts 6 and the holder 11 in parallel relation.

We claim:
1. A method of forming a hollow blank, the method comprising:
   a. providing a die, the die including:
      a. a holder having a tapering inner surface with a plurality of raceways that extend along the tapering inner surface towards a bottom of the holder;
      b. a plurality of die inserts received in the race ways of the holder, the die inserts being able to slide along the race ways from a closed position where they are fully received in the holder and an open position where they are at an elevated position in the holder, the die inserts each having an inner surface which together define a cavity where there is open space between the die inserts when they are in a closed position;
      c. a mandrel that can be received in the cavity between the die inserts when the die inserts are in the closed position, the mandrel having an outer diameter that widens from the bottom of the mandrel to the top of the mandrel; wherein
      d. profiling is provided on the inner surfaces of the inserts that forms a radial outer contour on the hollow blank when the mandrel is inserted through the hollow blank received in the cavity between the die inserts and causes plastic deformation of a material of the blank;
   b. moving the die inserts in the holder into an open position;
   c. placing the hollow blank in the cavity formed by the die inserts, the hollow blank having an internal bore, an external surface, and a trailing end;
   d. moving the die inserts into a closed position;
   e. guiding the mandrel through the internal bore of the blank such that the mandrel protrudes all the way through the blank and the passage of the mandrel through the blank causes the material of the blank to be extruded outwardly into the profiling provided on the inner surfaces of the inserts forming an external contour on an outer surface of the blank;
   f. reversing a direction of the mandrel to remove the mandrel from the trailing end of the blank;
   g. moving the die inserts into the open position;
   h. extracting the hollow blank from the die inserts.
2. The method of claim 1, wherein:
the profiling provided on the inner surfaces of the die inserts creates a raised external helix on the hollow blank inserted into the cavity between the die inserts.
3. The method of claim 1, wherein:
creating an internal threaded portion in the internal bore of the hollow blank.
4. The method of claim 1, wherein:
the mandrel also forms a driving tool fitting portion in the internal bore of the blank.
5. The method of claim 1, wherein:
the external contour has an outer diameter, and the trailing end of the blank has an outer diameter, and the outer diameter of the external contour is larger than the diameter of the trialing end of the blank.
6. The method of claim 1, wherein:
the external contour formed on the outer surface of the blank extends a substantial distance along a longitudinal axis of the blank.

* * * * *